United States Patent [19]

Hirata

[11] Patent Number: 5,010,550
[45] Date of Patent: Apr. 23, 1991

[54] TRANSMISSION LINE SWITCHING SYSTEM

[75] Inventor: Yoshimi Hirata, Tokyo, Japan
[73] Assignee: NEC Corporation, Japan
[21] Appl. No.: 305,927
[22] Filed: Feb. 2, 1989

[30] Foreign Application Priority Data

Feb. 4, 1988 [JP] Japan .................. 63-22916

[51] Int. Cl.$^5$ ............................................. G06F 11/20
[52] U.S. Cl. ......................... 371/8.2; 340/825.01; 340/825.03; 370/16; 455/8
[58] Field of Search ............... 371/8.2, 11.2, 34, 24, 371/20.5, 20.4, 20.1; 340/825.01, 825.03, 826, 827; 370/16, 16.1; 375/40; 455/8; 364/200, 900

[56] References Cited

U.S. PATENT DOCUMENTS

| | | | |
|---|---|---|---|
| 3,111,624 | 11/1963 | Farkas | 340/825.01 X |
| 3,681,694 | 8/1972 | Sarati | 371/8.2 X |
| 4,365,247 | 12/1982 | Bargeton | 371/8.2 |
| 4,365,248 | 12/1982 | Bargeton | 370/16 X |
| 4,442,518 | 4/1984 | Morimoto | 371/8.2 |
| 4,633,473 | 12/1986 | Ratchford | 371/8.2 |
| 4,680,776 | 6/1987 | Ikeuchi | 375/40 |

OTHER PUBLICATIONS

"Computer Aided Digital Transmission Protection Switching System" by Yasuyuki Suzuki, Japan Telecommunications Review, vol. 25, No. 1, Jan., 1983, pp. 39–48.

Primary Examiner—Jerry Smith
Assistant Examiner—Robert W. Beausoliel
Attorney, Agent, or Firm—Ostrolenk, Faber, Gerb & Soffen

[57] ABSTRACT

A transmission line switching system includes transmission terminal matrix switches, reception terminal matrix switches and monitor circuits. Switching to and returning of the switching from any of the standby transmission lines are performed by connection of each of the matrix switches. An output from a control signal transmitter is connected to switching destination and switching returning destination transmission lines via the transmission matrix switch before the switching and returning of the switching, and control signals supplied through the transmission lines are received by a control signal receiver via the monitor circuit, thereby checking normality of the transmission lines.

6 Claims, 2 Drawing Sheets

TRANSMISSION LINE SWITCHING SYSTEM

BACKGROUND OF THE INVENTION

The present invention relates to a transmission line switching system comprising a plurality of normal transmission lines and standby transmission lines, in which when a failure occurs on any of the normal transmission lines, the normal transmission line is switched to one of the standby transmission lines, and when the switched normal transmission line is recovered, control returns to the recovered normal transmission line.

In such a transmission line switching system, for example see that disclosed in the publication of "Computer-Aided Digital Transmission Protection Switching System" by Yasuyuki Suzuki, JTR January, 1983, PP. 39 to 48, switching operations must be simultaneously performed on a single transmission line at both transmission and reception terminals. In order to accurately perform switching at the transmission and reception terminals, a transmission line used exclusively for the transmission of switches, information is connected between both the terminals.

In a conventional system, an extra installation cost is therefore required for an exclusive transmission line, resulting in an economical disadvantage. In addition, upon switching to a standby transmission line and subsequent returning to a normal transmission line which has been recovered, no normality check is performed for either the switching destination or switching returning destination. Therefore, if a failure also occurs on a standby transmission line or, if a normal transmission line which is determined to be recovered is still incomplete, communication is undesirably interrupted.

SUMMARY OF THE INVENTION

It is, therefore, an object of the present invention to provide a transmission line switching system capable of reliably performing transmission line switching without the need for an exclusive transmission line for transmitting line switching information.

In order to achieve the above object of the present invention, there is provided a transmission line switching system including a plurality of normal transmission lines and a plurality of standby transmission lines, in which when a failure occurs on any of the normal transmission lines, switching is performed to switch transmission to one of the standby transmission lines, and when the switched normal transmission line recovers, control is returned to the recovered normal transmission line. The invention comprises transmission terminal matrix switches, each connected at transmission terminals of the transmission lines, for arbitrarily connecting the same number of transmission inputs as that of the normal transmission lines and an output from a control signal transmitter to the normal transmission lines and the standby transmission lines, reception terminal matrix switches, each connected at reception terminals of the transmission lines, for arbitrarily connecting the normal transmission lines and the standby transmission lines to the same number of reception outputs as that of the normal transmission lines, and monitor circuits each for branching signals from the normal transmission lines and the standby transmission lines to the control signal receiver, wherein switching to and returning of the switching from any of the standby transmission lines are performed by connection of each of the matrix switches, the output from the control signal transmitter is connected to switching destination and switching returning destination transmission lines via the transmission matrix switch before the switching and returning of the switching, and control signals supplied through the transmission lines are received by the control signal receiver via the monitor circuit, thereby checking normality of the transmission lines.

DETAILED DESCRIPTION OF THE PREFERRED EMBODIMENT

An embodiment of the present invention will be described below with reference to the accompanying drawings.

Figure 1:
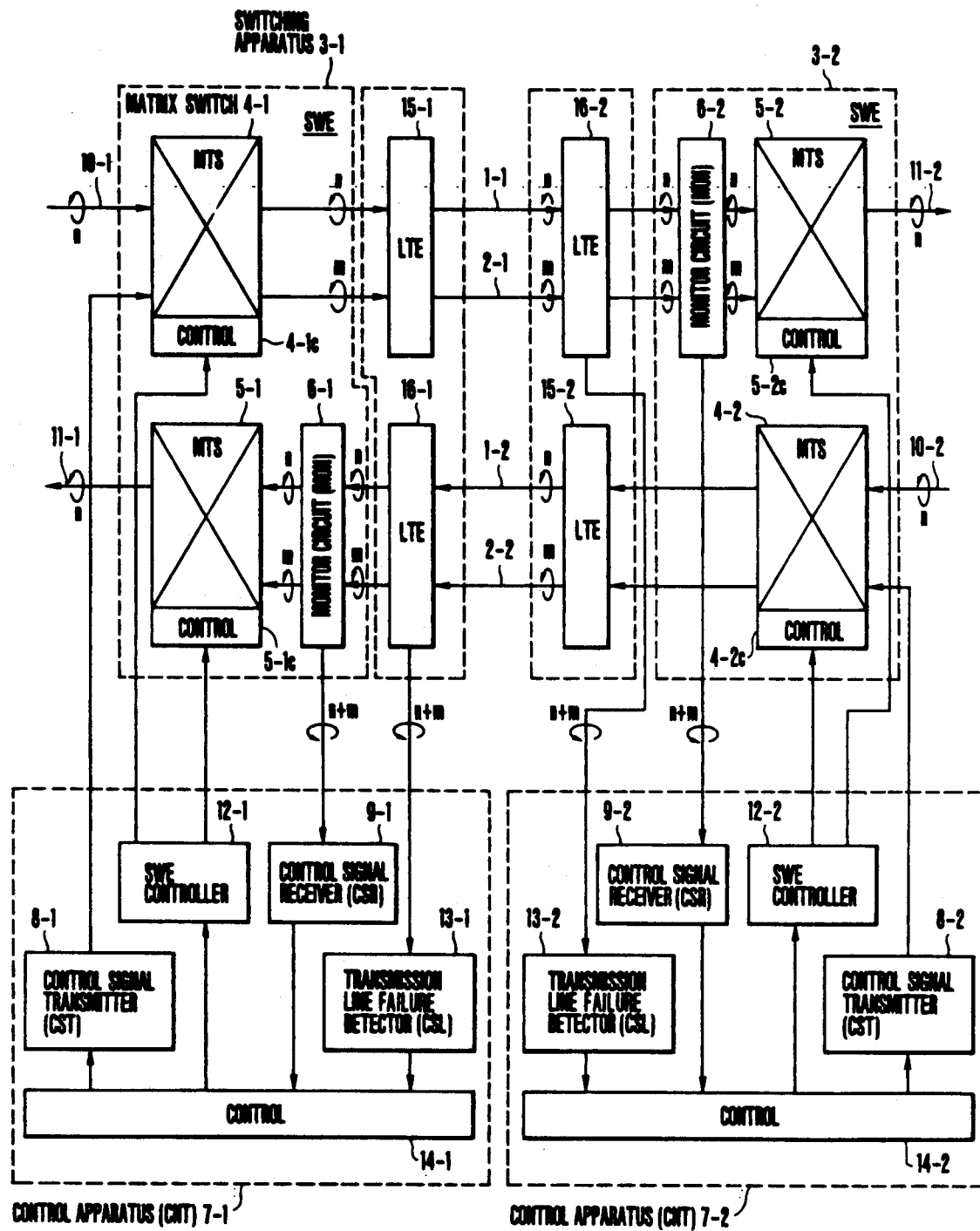
FIG. 1 is a block diagram showing an embodiment of the present invention.

Referring to FIG. 1, a bidirectional communication channel comprises a pair of n unidirectional normal transmission lines 1-1 and m unidirectional standby transmission lines 2-1 and a pair of n unidirectional normal transmission lines 1-2 and m unidirectional standby transmission lines 2-2. Each of the unidirectional normal transmission lines 1-1 extending between switching apparatus 3-1 and a switching apparatus 3-2 has a corresponding unidirectional normal transmission line 1-2 extending between switching apparatus 3-2 and switching apparatus 3-1. Each associated pair of unidirectional normal transmission lines (i.e., one transmission line of the lines 1-1 and a corresponding respective one of the transmission lines of the lines 1-2) together form a bidirectional transmission line. Similarly, each of the m unidirectional standby transmission lines 2-1 extending between switching apparatus 3-1 and switching apparatus 3-2 has a corresponding unidirectional standby transmission line in the unidirectional standby transmission lines 2-2 extending between switching apparatus 3-2 and switching apparatus 3-1. Each pair of unidirectional standby transmission lines together form a single bidirectional standby transmission line.

A switching apparatus (to be referred to as an SWE hereinafter) 3-1 (3-2) connected to transmission or reception terminals of the transmission lines 1-1 to 2-2 via line terminal equipment (to be referred to as LTEs hereinafter) 15-1 and 16-1 (15-2 and 16-2). The SWE 3-1 (3-2) includes a transmission terminal matrix switch (to be referred to as an MTS hereinafter) 4-1 (4-2) and a reception terminal MTS 5-1 (5-2). The SWE 3-1 (3-2) also includes at its reception terminal side a monitor circuit (to be referred to as an MON hereinafter) 6-1 (6-2) for bridging and branching signals from the transmission lines 1-2 and 2-2 (1-1 and 2-1). The MTSs 4-1, 4-2, 5-1 and 5-2 include control units 4-1c, 4-2c, 5-1c and 5-2c for controlling connection/disconnection of inputs to/outputs from the MTSs, respectively. The LTE 5-1 (15-2) can transmit a signal from the SWE 3-1 (3-2) to external transmission lines. The LTE 16-1 (16-2) can receive signals from external transmission lines and generate an alarm if signal reception from the external transmission lines becomes abnormal (a failure occurs on a transmission line).

Control apparatuses (to be referred to as CNTs hereinafter) 7-1 and 7-2 are associated with the SWEs 3-1 and 3-2, respectively. The control apparatus 7-1 (7-2) includes a control signal transmitter (to be referred to as a CST hereinafter) 8-1 (8-2), a control signal receiver (to be referred to as a CSR hereinafter) 9-1 (9-2), an SWE controller 12-1 (12-2), a transmission line failure detector (CSL) 13-1 (13-2), and a control unit 14-1 (14-2) for controlling these circuits. The control units 14-1 and 14-2 control the standby transmission lines 2-2 and 2-1, respectively, i.e., control both currently-used and currently-nonused standby transmission lines. When the transmission line failure detectors 13-1 and 13-2 detect failures on normal transmission lines via the LTEs 16-1 and 16-2, respectively, the control units 14-1 and 14-2 select a necessary number of (e.g., a set of upward and downward) standby transmission lines from currently-nonused standby transmission lines and replace the normal transmission lines with the selected standby transmission lines. Each of the control units 14-1 and 14-2 comprises a microcomputer and performs control operations of the entire CNT such as failure detection, failure recovery determination, switching, and switching returning. Outputs from the CSTs 8-1 and 8-2 are connected to the MTSs 4-1 and 4-2 to supply control signals, respectively. The inputs of the CSRs 9-1 and 9-2 are connected to the outputs of the MONs 6-1 and 6-2 to receive the control signals, respectively. The SWE controller 12-1 (12-2) supplies SWE control information to the control units 4-1c and 5-1c (4-2c and 5-2c) under the control of the control unit 14-1 (14-2). When the transmission line failure detector 13-1 (13-2) receives transmission line failure information from the LTE 16-1 (16-2), it informs the control unit 14-1 (14-2) of occurrence of the failure.

In this arrangement, each of the number of transmission inputs 10-1 (10-2) to the MTSs 4-1 (4-2) and that of reception outputs 11-1 (11-2) from the MTS 5-1 (5-2) is n which is the same number as that of the normal transmission lines 1-1 (1-2). The MTS 4-1 (4-2) can arbitrarily connect the transmission inputs 10-1 (10-2) and the output from the CST 8-1 (8-2) to the normal transmission lines 1-1 (1-2) and the standby transmission lines 2-1 (2-2) via the LTE 16-1 (16-2). The MTS 5-1 (5-2) can arbitrarily connect the normal transmission lines 1-2 (1-1) and the standby transmission lines 2-2 (2-1) to the reception outputs 11-1 (11-2) via the MON 6-1 (6-2) and the LTE 16-1 (16-2).

That is, in this arrangement, the MTS 4-1 (4-2) has n+1 inputs and n+m outputs, the MTS 5-1 (5-2) has n+m inputs and n outputs, and each input can be freely connected to any of the outputs under the control of the CNT 7-1 (7-2).

Therefore, if a failure occurs on one of the normal transmission lines 1-1 (1-2), switching is performed to any of the standby transmission lines 2-1 (2-2) by the MTSs 4-1 and 5-2 (4-2 and 5-1). Similarly, when the switched normal transmission line is recovered, control returns to the recovered transmission line.

An operation of the above arrangement will be described below.

Assume that a failure occurs on a normal transmission line.

For example, if the transmission line failure detector 13-1 detects a failure on one of the transmission lines 1-2, the control unit 14-1 selects a specific standby transmission line from the currently nonused standby transmission lines 2-2 and sends a command to the control unit 5-1c via the SWE controller 12-1 so that the corresponding one of the standby transmission lines 2-1 so selected is connected to the output of the CST 8-1.

After the MTS 4-1 completes this connection, the control unit 14-1 sends a first switching command (identifying the selected standby transmission line of the lines 2-2 to the SWE 3-2 of the opposing station via the CST 8-1), and the MTS 4-1 and the corresponding selected standby transmission line of the standby transmission lines 2-1. At the SWE 3-2, the first switching command is received by the control unit 14-2 via the LTE 16-2, the MON 6-2 and the CSR 9-2.

When the control unit 14-2 receives this command, the command is supplied to the control unit 4-2c of the MTS 4-2 via the SWE controller 12-2 in order to send a response to the selected standby transmission line (one of the lines 2-2) designated by the first switching command.

After the MTS 4-2 completes the connection, the SWE 3-2 sends the response to the SWE 3-1 via the CST 8-2, the MTS 4-2 and the selected transmission line of the lines 2-2.

When the response from the SWE 3-2 is received by SWE 1, the SWE 3-1 determines that the selected standby transmission line is normal and sends a second switching command to the SWE 3-2. When a time T1 has passed after the second switching command is sent, the control unit 14-1 of the SWE 3-1 switches the MTS 5-1 to perform a connection change, i.e., switching from the normal transmission line to the standby transmission line. That is, in this case, the time T1 is set in consideration of a time required for the second switching command to reach the SWE 3-2 and such that switching operations are simultaneously performed at both the MTSs.

At the SWE 3-2, when the second switching command is received, the MTS 4-2 is immediately switched to perform connection change from the normal transmission line to the standby transmission line.

If the normal transmission line is recovered, the normal transmission line is checked before switching is returned. If the normal transmission line is determined to be normal, control returns from the standby transmission line to the normal transmission line.

More specifically, control is returned in substantially the same steps as those performed when a failure occurs on a normal transmission line.

A transmission line switching operation of the present invention will be described in more detail below. In the following description, normal transmission lines are represented by X(10) and standby transmission lines are represented by Y(3).

(1) Assume that at the station A (SWE 3-1 side), a transmission line failure detector (EDC, not shown) detects an abnormality of a transmission line X(n) ($1 \leq n \leq 10$) for reception in accordance with, e.g., reception signal input interruption from a transmission line or a reception signal failure.

(2) Upon abnormality detection, the EDC sends, e.g., a ground signal representing that the X(n) is abnormal to the transmission line failure detector (CSL) 13-1 of the CNT 7-1.

(3) When the transmission line failure detector 13-1 receives the ground signal from the EDC of the LTE 16-1, it transmits transmission line failure information representing that a failure occurs on the X(n) to the control unit 14-1.

(4) When the control unit 14-1 receives the transmission line failure information from the transmission line failure detector 13-1, it refers to an standby transmission line operation state management table provided therein. The control unit 14-1 selects a currently-nonused transmission line $Y(m)$ ($1 \leq m \leq 3$) from the standby transmission lines $Y(3)$ and sets data representing "Currently-Used" in a portion corresponding to the $Y(m)$ of the standby transmission line operation state management table. Meanwhile, if all the transmission lines $Y(3)$ are currently used, the control unit 14-1 stops the processing.

(5) The control unit 14-1 then sends an SWE control command including connection information about inputs/outputs of the MTS to the SWE controller 12-1 so that an output transmission line corresponding to the $Y(m)$ of the transmission MTS 4-1 in the SWE 3-1 is switched to the $(n+1)$th input connected to the CST 8-1.

(6) When the SWE controller 12-1 receives the SWE control command from the control unit 14-1, it outputs an SWE switching command to the controller 4-1c of the MTS 4-1 so that the output transmission line corresponding to the $Y(m)$ is switched to the $(n+1)$th input, i.e., the output of the CST 8-1.

(7) In response to the SWE switching command, the controller of the MTS 4-1 switches the MTS 4-1 and supplies switching completed information representing that the switching has been completed to the SWE controller 12-1.

(8) When the SWE controller 12-1 determines that the switching of the MTS 4-1 has been completed, it sends this information to the control unit 14-1.

(9) When setting of the MTS 4-1 is completed, the control unit 14-1 outputs the first switching command to the CST 8-1 so that the CST 8-1 transmits information of the first switching command including the information of the $Y(m)$ to the station B (SWE 3-2 side).

(10) When the CST 8-1 receives the first switching command, it outputs to the CNT 7-2 of the station B the first switching command which is encoded so as to be separated by the monitor circuit 6-2 of the station B.

(11) The $n+m$ transmission lines monitored by the MON 6-2 of the station B are connected to the CSR 9-2 of the CNT 7-2. The control unit 14-2 which periodically checks whether the CSR 9-2 receives information determines that the switching command is transmitted from the station A.

(12) When the control unit 14-2 receives the first switching command from the station A via the CSR 9-2, it outputs an SWE switching command to the SWE controller 12-2 so that the SWE controller 12-2 switches the input $Y(m)$ of the MTS 4-2 to the output of the CST 8-2.

(13) The SWE controller 12-2 sends an SWE switching command corresponding to the received SWE switching command to the controller 4-2c of the MTS 4-2.

(14) In response to the SWE switching command, the controller 4-2c of the MTS 4-2 switches the MTS and informs the SWE controller 12-2 of the end of switching.

(15) The SWE controller 12-2 sends this information to the control unit 14-2.

(16) When the control unit 14-2 determines that the switching of the MTS 4-2 is completed, it sends response information to the CST 8-2 so that the CST 8-2 transmits the response information including information of first switching command reception to the station A.

(17) When the CST 8-2 receives the response information, it encodes the information so as to be separated by the MON 6-1 of the station A and transmits the response information.

(18) The CSR 9-1 of the station A determines that the response information from the station B is received at the $Y(m)$ via the MON 6-1, and then supplies the information to the control unit 14-1.

(19) When the control unit 14-1 receives the response information, it determines that the $Y(m)$ is normal. The control unit 14-1 therefore outputs the second switching command to the CST 8-1 so that the CST 8-1 transmits a control signal for switching the input $X(n)$ of the MTS 5-2 to the $Y(m)$ and switching the input 10-2(n) of the MTS 4-2 to the $Y(m)$.

(20) The control unit 14-1 prepares, for the SWE controller 12-1, switching end information for commanding switching of the input of the $Y(m)$ of the MTS 4-1 from the output of the CST 8-1 to the 10-1(n) and switching of the output of the $Y(m)$ of the MTS 5-1 to 11-1(n) and then activates a switching timing adjustment timer provided therein.

(21) When the CST 8-1 receives the second switching command, it encodes and transmits the command.

(22) When the control unit 14-2 of the station B receives the second switching command via the MON 6-2 and the CSR 9-2, it supplies an SWE control command to the SWE controller 12-2 so that the SWE controller 12-2 performs control described in 21).

(23) In accordance with the operations of 6) to 9), the SWE controller 12-2 controls the control units 5-2c and 4-2c of the MTSs 5-2 and 4-2, respectively, to perform the switching described in 21).

(24) At the station A, switching is performed simultaneously with that at the station B by the switching end information timing-adjusted by the timer.

(25) When the control unit 14-2 of the station B receives switching end information from the SWE controller 12-2, it sets data representing "Currently-Used" in a portion corresponding to the $Y(m)$ of an standby transmission line operation state management table provided therein.

Note that in the above arrangement, the CSRs 9-1 and 9-2 commonly receive the $n+m$ outputs of each of the MONs 6-1 and 6-2 and can receive a signal from any of the transmission lines 1-1 and 2-1 or 1-2 and 2-2. Therefore, even if the output of the CSTs 8-1 and 8-2 is connected to any of the transmission lines 1-1 to 2-2 at the MTS 4-1 or 4-2 at the transmission terminal, the above check and control can be performed.

Figure 2:
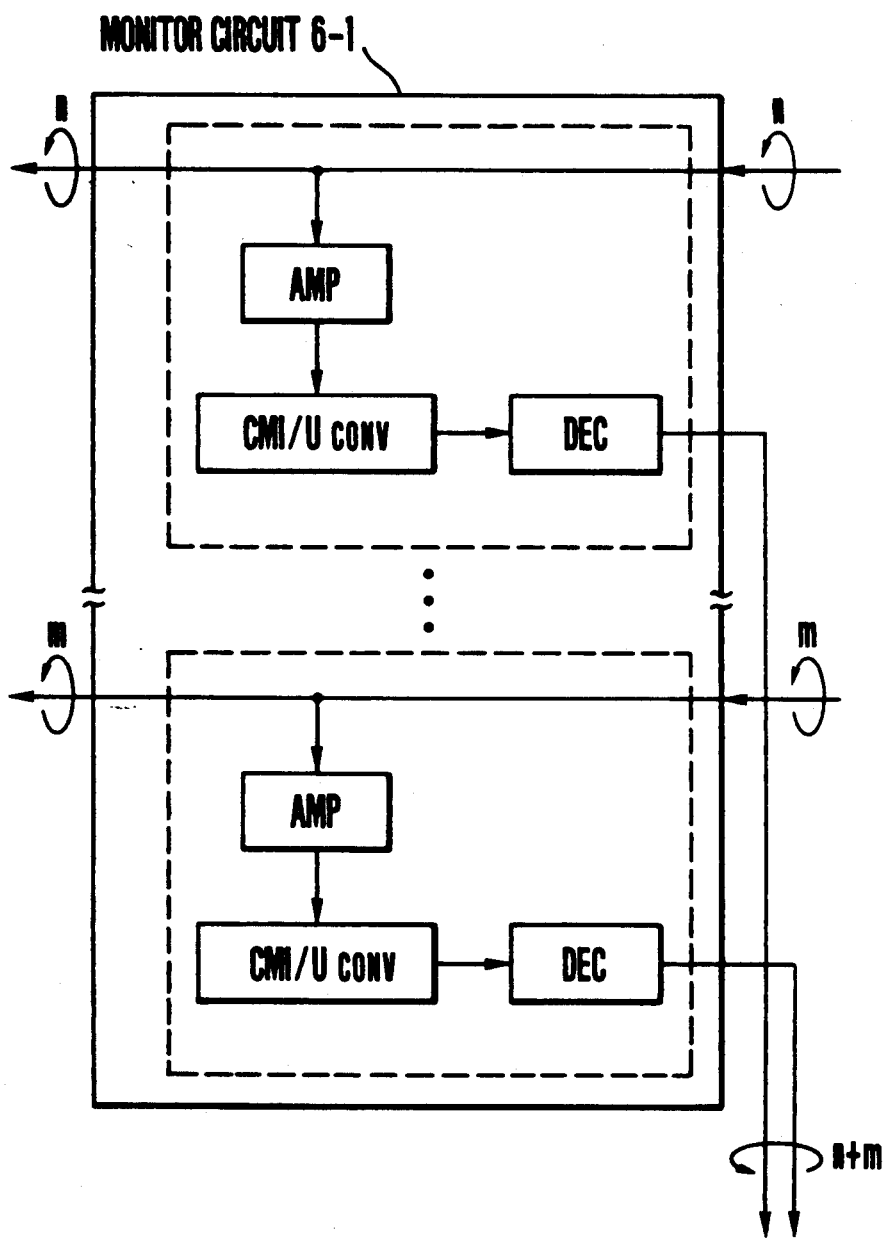
FIG. 2 is a block diagram showing an embodiment of a monitor circuit shown in FIG. 1.

The monitor circuits (MONs) 6-1 and 6-2 used in the present invention are arranged, for example, as shown in FIG. 2. Referring to FIG. 2 in which the MON 6-1 is exemplified, the MON 6-1 comprises an amplifier AMP having a high input impedance and connected to the transmission lines, a CMI/U converter CMI/U CONV for converting a CMI (Code Mark Inversion) signal CMI supplied from the amplifier AMP into a unipolar signal, and a decoder DEC for decoding an output from the converter. An output from the decoder DEC is supplied to the control signal receiver (CSR) 9-1.

Figure 3:
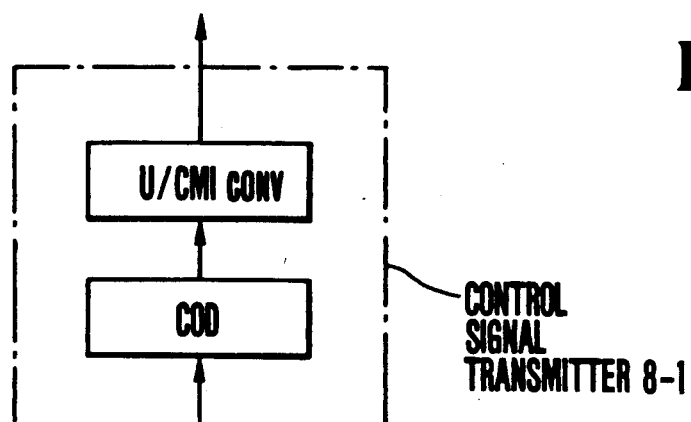
FIG. 3 is a block diagram showing an embodiment of a control signal transmitter shown in FIG. 1 and corresponding to FIG. 2.

In this embodiment, as shown in FIG. 3, the control signal transmitter (CST) 8-1 of the control apparatus (CNT) 7-1 comprises a coder COD and a converter U/CMI CONV for coverting a unipolar signal as an output from the coder COD into a CMI signal, so that a signal supplied from the control unit 14-1 is not used as an alarm signal by the LTE.

As has been described above, according to the present invention, the matrix switches perform mutual switching between normal transmission lines and standby transmission lines, and a control signal is exchanged using switching destination and switching returning destination transmission lines. Therefore, no exclusive information transmission line is required to lead to an economical advantage. In addition, since normality of a transmission line to be used can be checked upon switching or returning of the switching, unexpected communication interruption can be completely prevented. As a result, high reliability can be obtained as a whole, and a significant effect can be obtained in transmission line switching in various applications.

What is claimed is:

1. A transmission line switching system, comprising:
   (A) a first plurality of normal transmission lines extending between first and second remote stations;
   (B) a second plurality of standby transmission lines extending between said first and second remote stations; and
   (C) control means for switching transmission between said normal and standby transmission lines as a function of the condition of said normal transmission lines, said control means;
      (1) monitoring the condition of said normal transmission lines;
      (2) upon detection of a failure in one of said normal transmission lines selecting one of said standby transmission lines and sending a control signal from said first station to said second station and then back to said first station over said selected standby transmission line; and
      (3) if said control signal is received at said first station and indicates that said selected standby transmission line has not failed, causing transmission to be switched from said failed normal transmission line to said selected standby transmission line.

2. The transmission line switching system of claim 1, wherein said control means:
   (A) continues to monitor said normal transmission lines after said transmission is switched to said selected standby transmission line;
   (B) upon the determination that the failed normal transmission line has recovered, sends a second control signal along said recovered normal transmission line for said first station to said second station and then back to said first station; and
   (C) if said second control signal is received at said first station and indicates that said recovered normal transmission line has in fact fully recovered, causes transmission to be switched from said selected standby transmission line to said recovered normal transmission line.

3. The transmission line switching system of claim 1, wherein said control means comprises:
   first and second matrix switches located at said first and second remote stations, respectively, said first and second matrix switches being for connecting a plurality of transmission signals to be transmitted through said transmission line switching system to those normal and standby transmission lines selected by said control means;
   means for sending said control signal through said first and second matrix switches and said selected standby transmission line; and
   means for causing said first and second matrix switches to switch the transmission of one of said transmission signals from said failed normal transmission line to said selected standby transmission line after said control signal is received at said first station and indicates that said selected standby transmission line has not failed.

4. The transmission line system of claim 3, wherein said control means causes said first and second matrix switches to switch between said failed normal transmission line and said selected standby transmission line simultaneously.

5. A method for switching transmission of signals between a first plurality of normal transmission lines extending between first and second remote stations and a second plurality of standby transmission lines extending between said first and second remote stations, the method comprising the steps of:
   (1) monitoring the condition of said normal transmission lines;
   (2) upon detection of a failure in one of said normal transmission lines, selecting one of said standby transmission lines and sending a control signal from said first station to said second station and then back to said first station over said selected standby transmission line; and
   (3) if said control signal is received at said first station and indicates that said selected standby transmission line has not failed, causing transmission to be switched from said failed normal transmission line to said selected standby transmission line.

6. The method of claim 5, further including the steps of:
   (1) continuing to monitor said normal transmission lines after said transmission has been switched to said selected standby transmission line;
   (2) upon the determination that the failed normal transmission line has recovered, sending a second control signal along said recovered normal transmission line from said first station to said second station and then back to said first station; and
   (3) if said second control signal is received at said first station and indicates that said recovered normal transmission line has in fact fully recovered, causing transmission to be switched from selected standby transmission line to said recovered normal transmission line.

* * * * *